United States Patent
Paszti (10) Patent No.: US 11,654,457 B2
(45) Date of Patent: *May 23, 2023

(54) METHOD AND SYSTEM FOR BATTERY DETECTION IN RECYCLING FACILITIES

(71) Applicant: TERRAPURE BR LTD., Ville Ste-Catherine (CA)

(72) Inventor: Michael D. Paszti, York (CA)

(73) Assignee: TERRAPURE BR LTD., Ville Ste-Catherine (CA)

( * ) Notice: Subject to any disclaimer, the term of this patent is extended or adjusted under 35 U.S.C. 154(b) by 0 days.

This patent is subject to a terminal disclaimer.

(21) Appl. No.: 17/328,186

(22) Filed: May 24, 2021

(65) Prior Publication Data

US 2021/0283662 A1    Sep. 16, 2021

Related U.S. Application Data

(63) Continuation of application No. 16/184,235, filed on Nov. 8, 2018, now Pat. No. 11,040,374.

(60) Provisional application No. 62/585,114, filed on Nov. 13, 2017.

(51) Int. Cl.
| | |
|---|---|
| *H01M 10/54* | (2006.01) |
| *B07C 5/34* | (2006.01) |
| *B29B 17/02* | (2006.01) |
| *G06K 7/10* | (2006.01) |
| *G06K 19/07* | (2006.01) |
| *H01M 10/0525* | (2010.01) |

(52) U.S. Cl.
CPC .......... *B07C 5/3412* (2013.01); *B29B 17/02* (2013.01); *G06K 7/10316* (2013.01); *G06K 19/0705* (2013.01); *G06K 19/0723* (2013.01); *H01M 10/0525* (2013.01); *H01M 10/54* (2013.01)

(58) Field of Classification Search
CPC ................ B29B 17/02; G06K 7/10316; G06K 19/0705; G06K 19/0723; H01M 10/0525; H01M 10/54

See application file for complete search history.

(56) References Cited

U.S. PATENT DOCUMENTS

| | | |
|---|---|---|
| 11,040,374 B2 | 6/2021 | Paszti |
| 2015/0108989 A1 | 4/2015 | Sloop |
| 2019/0148797 A1 | 5/2019 | Paszti |

FOREIGN PATENT DOCUMENTS

| | | |
|---|---|---|
| CN | 111386475 A | 7/2020 |
| EP | 0795919 A2 | 9/1997 |
| EP | 3710856 A1 | 9/2020 |
| WO | 9419838 A1 | 9/1994 |
| WO | 2019090427 A1 | 5/2019 |

OTHER PUBLICATIONS

Binks, Steve, "Lead, lithium recycling mix: a clear and present danger", Batteries International, Spring 2015, pp. 12-13.
Gaines, Linda, "The future of automotive lithium-ion battery recycling: Charting a sustainable course", Sustainable Materials and Technologies, vols. 1-2, Dec. 2014, 6 pages.

(Continued)

*Primary Examiner* — Jane J Rhee
(74) *Attorney, Agent, or Firm* — GTC Law Group PC & Affiliates (57) ABSTRACT

Methods for detecting electronics amongst a plurality of recycling materials.

20 Claims, 4 Drawing Sheets

(56) References Cited

OTHER PUBLICATIONS

PCT/CA18/51413, "International Application Serial No. PCT/CA18/51413, International Preliminary Report on Patentability dated May 28, 2020", Terrapure Environmental, 5 pages.
PCT/CA18/51413, "International Application Serial No. PCT/CA18/51413, International Search Report and Written Opinion dated Feb. 7, 2019", Terrapure Environmental, 7 pages.
18877171.1, "European Application Serial No. 18877171.1, Extended European Search Report dated Jul. 19, 2021", Terrapure Environmental, 5 pages.

METHOD AND SYSTEM FOR BATTERY DETECTION IN RECYCLING FACILITIES

CLAIM OF PRIORITY

This application is a continuation of and claims priority to U.S. patent application Ser. No. 16/184,235, filed Nov. 8, 2018 and entitled METHOD AND SYSTEM FOR BATTERY DETECTION IN RECYCLING FACILITIES.

U.S. application Ser. No. 16/184,235 claims priority to U.S. Provisional Patent Application Ser. No. 62/585,114, filed Nov. 13, 2017 and entitled METHOD AND SYSTEM FOR LITHIUM BATTERY DETECTION IN RECYCLING FACILITIES.

Each of the foregoing applications is incorporated herein in the entirety, for all purposes.

BACKGROUND

Field

The present application generally relates to detection of materials containing electronics in a recycling facility, and more specifically to the detection of batteries containing electronics amongst a plurality of recycling materials.

Description of the Related Art

Over 10,000,000 tons of lead-acid batteries (LABs) are recycled every year globally. One of the early steps in the process is what is referred to as battery breaking, which involves disintegrating the batteries mechanically so that the acid can drain. This is normally a reliable and safe process; however, problems can occur when batteries other than LABs accidentally enter the process.

The biggest risk is from components with electronics, such as lithium-ion batteries (LIBs). For instance, upon entering the breaking process, LIBs have been known to explode and cause substantial damage to equipment, and expose plant personnel to potential harm. Separating the LIBs from the LAB s is a challenging task as they often look identical or similar.

The LAB recycling industry has proposed several ideas to identify LIBs but require tagging or color coding of the LIBs at their point of manufacture. Getting all LIB makers around the world to agree to modify their designs at additional cost would be very challenging. In addition, none of these solutions apply to the countless LIBs already in use.

An improved process for identifying LIBs in an LAB recycling process is needed to help ensure safety in a recycling facility.

SUMMARY

Methods and systems are disclosed for detecting electronics amongst a plurality of recycling materials.

An example system includes a battery detection facility including a non-linear junction detector and a detection antenna system, where the battery detection facility is adapted to detect, through interrogation of an RF signal, a battery comprising an electronic circuit amongst a plurality of recycling materials, where the detection antenna system emits the RF signal and detects the battery when the detection antenna system receives a returned detected RF signal that is a harmonic of the RF signal as emitted by the electronic circuit in the battery.

Certain further aspects of an example system are described following, any one or more of which may be present in certain embodiments. An example system includes where the plurality of recycling materials is disposed on a conveyor belt in a conveyor facility and the battery detection facility is mounted proximate to the conveyor facility; where the conveyor belt includes an RF reflecting material; and/or where the reflecting material reflects at least one of the emitted RF signal or the returned detected RF signal. An example system includes where the plurality of recycling materials is disposed on a conveyor belt in a conveyor facility and the battery detection facility is mounted proximate to the conveyor facility; where the conveyor belt comprises an RF reflecting material; further comprising a second battery detection facility comprising a second non-linear junction detector and a second detection antenna system adapted to detect the battery through interrogation of a second RF signal, the battery detection facility mounted proximate to the conveyor facility, where the detection antenna system and the second detection antenna system are independently positionable with respect to the conveyor facility; where the battery detection facility is further configured to detect the battery when the detection antenna system receives a second returned detected RF signal as a result of the second detection antenna system emitting a second RF signal; and/or where the reflecting material reflects at least one of the RF signal, the returned detected RF signal, or the second returned detected RF signal. An example system includes where the battery is a lithium-ion battery. An example system includes where detection antenna system is a narrow field of view single sweeping antenna; where the narrow field of view single sweeping antenna is a mechanical sweeping antenna; where the narrow field of view single sweeping antenna is a phase-array antenna that electronically sweeps; and/or where the narrow field of view single sweeping antenna is a combination of mechanical sweeping and sweeping with a phase-array antenna. An example system includes where the detection antenna system comprises a plurality of narrow field of view antennas each covering a different area; further providing RF shielding to block RF radiation from an area beyond the conveyor facility; further comprising an articulation facility mounted on the conveyor facility; where the articulation facility orients batteries on the conveyor facility to enhance the detection of the battery; where the articulation facility is adapted to remove the battery after detection; and/or where the articulation facility further comprises a vision system that provides detection information to the articulation facility for control of a mechanical articulator for manipulation of a battery on the conveyor facility. An example system includes where the battery detection facility is communicatively coupled to a user interface on a client computing device, where the user interface comprises one or more indicators for alerts transmitted from the battery detection facility based on a detection condition; where the user interface is adapted to transmit a detection action to an articulation facility related to removal of the battery from the plurality of recycling materials; and/or where the user interface is adapted to transmit a detection indication to a recycling source. An example system includes where the battery detection facility includes a ruggedization element to protect the detection antenna system from corrosive materials or other contaminants resulting from breakage of a plurality of batteries including at least one of a coating or shield against the corrosive materials or other contaminants. An example system includes where the battery detection facility includes a self-cleaning element to clean the detection antenna system of corrosive materials and other contaminants resulting from breakage of a plurality of batteries. An example system includes where the battery detection facility is adapted to perform a calibration for a detection environment proximate the battery detection facility to reduce extraneous RF radiation, where the calibration comprises at least one of adjusting an RF power level or adjusting an antenna position. An example system includes where the battery detection facility further comprises a RF shielding to prevent RF energy from radiating into an area proximate to the battery detection facility. An example system includes further comprising an RF shield mounted around the plurality of recycling materials, where the detection antenna system is adapted for insertion inside the RF shield for detection of the battery while preventing RF energy from radiating outside the RF shield. An example system includes where the battery detection facility is communicatively coupled to a detection database, where the detection database is adapted to store past detection information from which the battery detection facility is adapted to determine past detection patterns to predict future detection events. An example system includes where the detection antenna system comprises a first antenna for transmitting the RF signal and a second antenna for transmitting a second RF signal, where the RF signal has a first frequency and the second RF signal has a second frequency; further where the first frequency is the same frequency as the second frequency, the battery detection facility is adapted to detect an interference pattern characteristic resulting from re-emission of harmonics from the electronic circuit in the battery, and the battery detection facility utilizes the detection of the interference pattern characteristic in detection or location of the battery; further where the first frequency is the same frequency as the second frequency, the battery detection facility is adapted to detect a beat frequency pattern characteristic resulting from re-emission of harmonics from the electronic circuit in the battery, and the battery detection facility utilizes the detection of the beat frequency pattern characteristic in detection or location of the battery; and/or further where the first frequency and the second frequency are different frequencies, the battery detection facility is adapted to detect a first harmonic resulting from the first frequency and a second harmonic resulting from the second frequency, and the battery detection facility is adapted to process the detection of the first harmonic and the second harmonic in determination of a location characteristic for the battery.

An example procedure includes an operation to detect, through interrogation of an RF signal, a battery amongst a plurality of recycling materials where a detection antenna system emits the RF signal and detects the battery when the detection antenna system receives a returned detected RF signal that is a harmonic of the RF signal as emitted by an electronic circuit in the battery.

Certain further aspects of an example procedure are described following, any one or more of which may be present in certain embodiments. An example procedure further includes an operation to detect is provided by the detection antenna system emitting multiple RF signals from multiple antennas; an operation where the returned detected RF signal is reflected by a reflecting surface proximate the plurality of recycling materials; an operation where the reflecting surface is a conveyor belt comprising RF reflecting material; and/or where the battery is a lithium-ion battery.

An example system includes a detection facility comprising a non-linear junction detector and a detection antenna system, wherein the detection facility is adapted to detect, through interrogation of an RF signal, an electronic circuit amongst a plurality of recycling materials, wherein the detection antenna system emits the RF signal and detects the electronic circuit when the detection antenna system receives a returned detected RF signal that is a harmonic of the RF signal as emitted by the electronic circuit.

Certain further aspects of an example system are described following, any one or more of which may be present in certain embodiments. An example system includes where the detection antenna system emits multiple RF signals from multiple antennas. An example system includes where the returned detected RF signal is reflected by a reflecting surface proximate the plurality of recycling materials; and/or where the reflecting surface is a conveyor belt comprising RF reflecting material. An example system includes where the electronic circuit is embedded in a battery; and/or where the battery is a lithium-ion battery.

BRIEF DESCRIPTION OF THE DRAWINGS

The following detailed description and certain embodiments thereof may be understood by reference to the following figures.

While the present disclosure has been described in connection with certain preferred embodiments, other embodiments would be understood by one of ordinary skill in the art and are encompassed herein.

DETAILED DESCRIPTION

While the disclosure throughout contemplates that any material containing electronics may be detected amongst a plurality of recycling materials by embodiments of the methods and systems described herein, for simplicity the description herein may generally refer to the detection of a lithium-ion battery (LIB) amongst a plurality of lead-acid batteries (LABs) as such. All references to LIBs throughout this disclosure should also be understood to be references to materials containing electronics (e.g., other battery types with embedded electronics, consumer or industrial components or products with embedded electronics, electronics components, and the like) and LABs to recycling materials (e.g., batteries, paper, plastics, metals, glass, textiles, organics, and the like).

Figure 1:
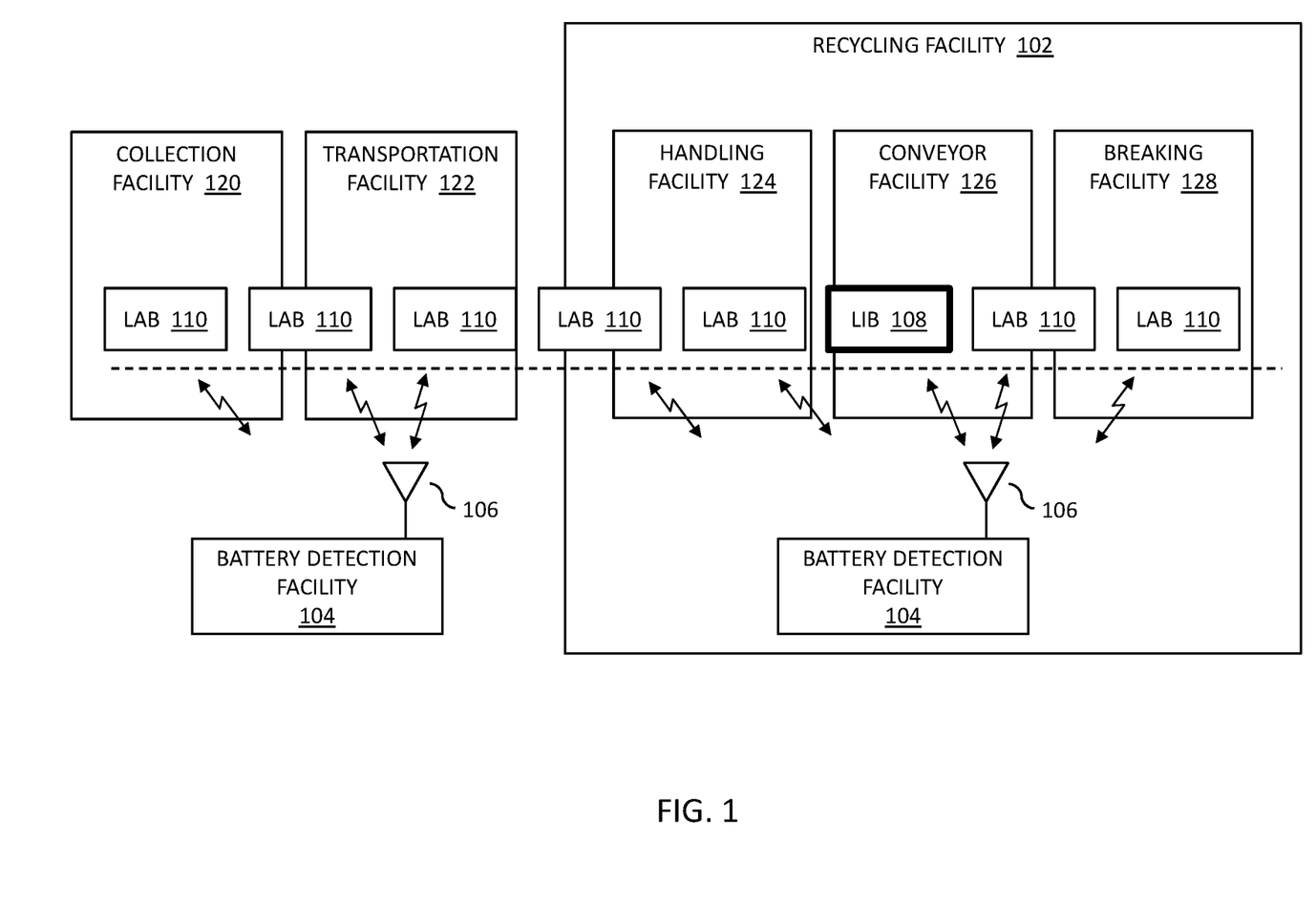
FIG. 1 depicts an embodiment battery detection facility within a recycling process.

Referring to FIG. 1, the present disclosure describes a battery detection facility 104 that can detect LIBs 108 through interrogation of an RF signal from a detection antenna system 106, such as where the detection occurs prior to a battery breaking stage in the recycling process in or leading to a recycling facility 102 that handles recycling of LABs 110. Embodiments of a battery detection facility 104 may include mounted units (e.g., mounted proximate to a conveyor facility 126 within the recycling facility, mounted on a transportation vehicle), mobile units (e.g., placed at or carried to locations within the recycling process), and the like, installed or employed at any point right up to the battery breaker stage of the recycling process. Embodiments of the battery detection facility 104 may be deployed at different stages of the recycling process, such as part of a collection facility 120 (e.g., a recycling center, a battery pickup service for automotive repair centers, and the like), a transportation facility 122 (e.g., vehicle for transporting materials for recycling, a mobile shipping container, and the like), a handling facility 124 in a recycling facility (e.g., receiving dock, storing facility, inspection station, receiving containers, and the like), a conveyor facility 126 in a recycling facility (e.g., a conveyor facility for transporting materials for recycling within a recycling facility, rolling transportation bins for transporting materials for recycling within a recycling facility, automated transporter for transporting materials for recycling within a recycling facility, robotic handling equipment for moving recycling materials within a recycling facility, and the like), a breaking facility 128 within a recycling facility (e.g., at the entrance to the breaking facility, at a recycling step just prior to a physical breaking step in a recycling facility, and the like), or other step throughout a recycling process that includes the recycling of LABs 110.

The ability of the battery detection facility 104 to detect LIBs takes advantage of a unique feature of LIBs that LABs lack. LIBs, in contrast to many other battery types, nearly always contain electronic circuitry. These electronics (e.g., a small electronic processor) play a vital role in the operation of LIBs, for example, ensuring that the battery does not overheat, overcharge, and/or over-discharge. LABs do not need or have any electronics. As a result, the battery detection facility 104 is able to detect the electronics in a LIB 108, such as amongst a plurality of LABs 110, alerting personnel (e.g., sounding alarm, sending a communication, and the like) or initiating an action (e.g., stopping a transporter, physically removing the LIB though a mechanized device, and the like), especially before a breaking process where the breaking of a LIB 108 may produce a danger to personnel and/or facility equipment (e.g., where the breaking process deforms the LIB and causes a short in the lithium-ion cell that in turn generates heat leading to the electrolyte boiling and a potential explosion or ignition of the cell/battery case). The battery detection facility 104 may also detect other battery types with embedded electronics amongst recycling materials, such as detecting a nickel cadmium battery or other battery types with embedded electronics mixed in with other recycling materials (e.g., detection of the nickel cadmium battery may prevent the heavy metal cadmium from entering the recycling stream). For example, batteries with embedded electronics may become inadvertently mixed in with a paper recycling stream, and the battery detection facility 104 may detect them before the recycling process begins. Further, the battery detection facility 104 may detect any component containing electronics to prevent the component from entering the recycling stream. For example, the battery detection facility 104, or more generally an electronics detection facility, may detect items entering the recycling facility that include embedded electronics (e.g., small items not usually associated with having electronics that might otherwise go unnoticed), preventing the electronics and any associated material content from mixing with the recycling process.

The ability for the battery detection facility 104 to detect electronics is due to an inherent response to semiconductor devices (e.g., transistors and diodes) to an RF signal. Within semiconductor devices is what is called a non-linear junction (NLJ) (e.g., any P-N junction within the semiconductor device). When an NLJ is exposed to radio frequencies (RF), it emits characteristic radio-frequency signals in response, including a second and third harmonic of the transmitted frequency of the RF signal. These signals can be detected, interpreted, and then used to, for instance, trigger an alert. Non-linear junction detectors (NLJDs) have been around since the 1960s, where their conventional use is to detect covert surveillance equipment such as listening devices, hidden cameras, tracking devices, and other clandestine electronics. However, their use has never been contemplated in LIB detection, nor as a facility for improving the safety within industrial LAB or other recycling processes.

The adaptation of an NLJD to the industrial application of detecting LIBs within a LAB recycling process (or more generally, to detect electronics-based components amongst recycling materials) presents many challenges. For example, although handheld NLJDs may help reduce the dangers of LIB entering the LAB recycling stream, their use is susceptible to human error. A single lapse in human attention and a LIB could be missed, resulting in a potential explosion within the facility when the LIB enters the breaking stage of the recycling process. Therefore, industrial applications need to be developed and deployed to ensure comprehensive coverage.

Figures 2A, 2B:
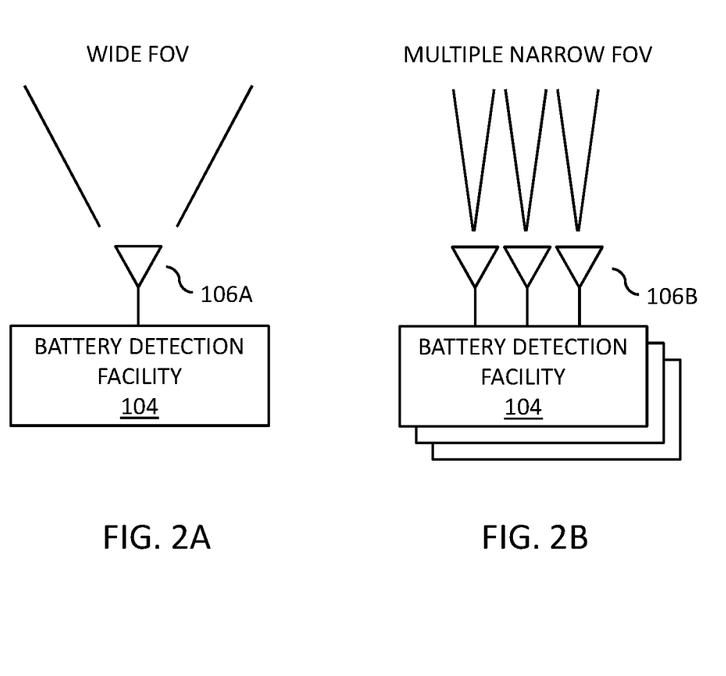
FIGS. 2A-C depict embodiment detection antenna configurations for a battery detection facility.

In embodiments, an industrial battery detection facility 104 may be deployed at different stages of the recycling process. In embodiments, a conveyor facility 126 located just before the breaking facility 128 may be an ideal place to deploy the battery detection facility 104. This is especially the case if the conveyor facility 126 employs a conveyor belt for transporting materials to be recycled (e.g., a plurality of batteries or other recycling materials disposed on the conveyor belt), such as where the conveyor belt has a width along which all materials must pass. Across this width, a detection antenna 106 may be configured to provide coverage across the conveyor belt. Referring to FIG. 2A, the detection antenna 106A may have a wide field of view (FOV), such as from a single antenna. However, practical considerations limit how far above the conveyor belt the detection antenna 106 could be located without causing the required RF power levels to exceed a safe level for the surrounding environment. High RF power levels may create an unsafe environment for humans to be near the detection antenna 106A. In addition, the wide FOV of the detection antenna 106A may result in unacceptable RF interference, such as from side lobes from a wide FOV detection antenna 106A.

Referring to FIG. 2B, in order to maintain a workable distance between the detection antenna 106 and the conveyor belt (e.g., with sufficient clearance above materials on the conveyor belt) with reduced RF signal power, a narrow-FOV antenna may be employed, where a narrow-FOV detection antenna 106B is utilized to cover the width of the conveyor belt. The narrow-FOV detection antenna 106B has the added benefit of being able to provide location information about where in the cross-conveyor area the LIB 108 has been detected. For instance, if the multiple narrow-FOV detection antenna 106B consists of an array of three narrow-FOV antennas, with a first, second, and third coverage area, the battery detection facility 104 could use the detection of a LIB by the first antenna to determine that the detected LIB 108 is in the first area. Thus, the multiple narrow-FOV detection antenna array 106B may provide an antenna configuration that reduces the required operational RF power and provide additional location information for the detection of a LIB 108.

In embodiments, a multiple antenna configuration may be configured as multiple detection antennas 106 controlled by a single battery detection facility 104, detection antennas 106 each controlled by separate battery detection facilities 104, or any combination thereof. Detection antennas 106 may be independently positionable around the detection environment (e.g., around the conveyor facility) to maximize coverage and to help mitigate against a LIB 108 being blocked from the antenna's RF signal, such as by a LAB 110.

In embodiments, a multiple antenna configuration may operate with RF output signals that are the same for all antennas (e.g., tuning the outputs to be same frequency) thus enabling different transmitted signals to be received and detected by other antennas in the multiple antenna configuration. Antennas within a multiple antenna configuration may be positioned to maximize this cross-over action amongst the different antennas. For instance, different antenna position configurations may yield different detection effectiveness due to RF reflecting surfaces within and around the operating environment (e.g., side walls on a conveyor facility, RF reflecting surfaces in the conveyor belt, conveyor rollers, conveyor structure surfaces, and the like). Further, multiple antenna transmission configurations with similar RF output signal frequencies may produce interference patterns from the radiation produced by the multiple sources, and these patterns may shift as the recycling materials are moved relative to the detection antennas 106 (e.g., batteries moving along a conveyor belt beneath statically positioned antennas, antennas moved over the batteries, and the like), where transitory peaks including from constructive and destructive interference in the detected signal may be used in the detection process.

In embodiments, a multiple antenna configuration may operate with RF output signals that are different or offset from one another. The tuning or detuning of the output RF signal between different detection antennas 106 may be due to a user action (e.g., purposely tuning or detuning the frequencies) or due to a configured tolerance range for the operating output frequency from the battery detection facility 104 (e.g., 'tuning' through tight selection of component tolerances, or 'de-tuning' through the use of components with wider tolerances). In embodiments, in an instance where output frequencies are offset from one another, the battery detection facility 104 may be configured to detect beat frequencies resulting from at least two offset frequencies, where peaks in the signal may be used in the detection process, such as where the recycling materials are moved relative to the detection antennas 106.

In embodiments, a multiple antenna configuration (with common or individual battery detection facilities) operating with different RF output signal characteristics (e.g., frequency, amplitude, modulation, and the like) may employ those differences in detection of a LIB 108. For instance, two battery detection facilities 104 may operate with two different RF output signal frequencies $f_1$ and $f_2$, which would then result in two sets of harmonics $h_1$ and $h_2$ when re-emitted from a LIB 108. The two battery detection facilities 104 may be configured to receive and distinguish between $h_1$ and $h_2$ which may aid in the detection and location of the LIB 108. For example, the two battery detection facilities 104 may be further configured to detect the direction from which $h_1$ and/or $h_2$ have come and use this information to triangulate the location of the LIB 108. In embodiments, the use of multiple RF output signal characteristics (from a single or multiple antennas) may be used to enhance detection through signal differentiation, such as to enhance detection, enhance location determination, reduce false positives, and the like.

Figure 2C:
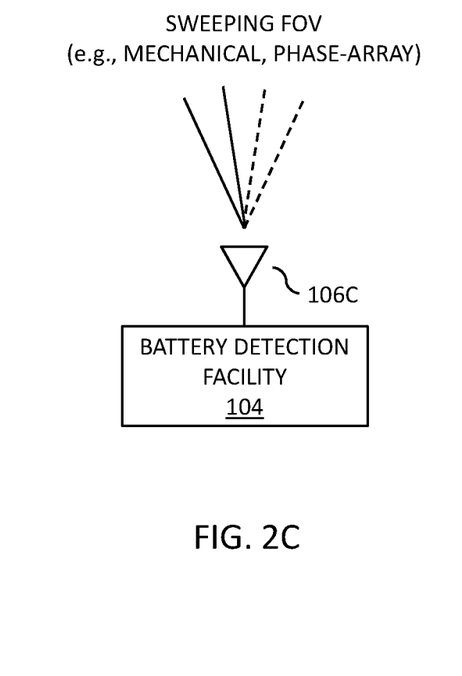

Referring to FIG. 2C, rather than using multiple narrow-FOV antennas to cover the area across the conveyor belt, a single sweeping narrow-FOV detection antenna 106C could be used. This would further reduce the RF power being emitted by the battery detection facility 104 by using only a single narrow-FOV antenna. The sweeping action could be produced by mechanically sweeping the direction of the detection antenna 106C back and forth across the width of the conveyor belt through a motorized antenna mount. One antenna could then provide full coverage of the conveyor belt. Sweep speed could be adjustable (e.g., manually and/or automatically) based on the speed of the conveyor belt to ensure coverage. Alternately, the reliability risk associated with the motor and movable parts of the mechanically sweeping antenna could be eliminated by using a single fixed-position phase-array antenna, where the sweeping action is controlled electronically. The phase-array solution could have a greater flexibility and reliability. Increased reliability may be especially important in the dusty and potentially corrosive industrial battery and other types of recycling environments, which could cause issues for the mechanical sweeping system. Further, a phase-array antenna may be easier to shield (or seal) from the dust and corrosives, making for a more ruggedized system that is easier to maintain and clean. Where an extremely wide FOV is required, mechanical sweeping and phase-array can be used in combination.

In embodiments, the detection antenna 106 may utilize the same antenna for transmission and reception of the RF signal, or use separate antenna components for transmission and reception (e.g., where the separate antennas use the same or separate battery detection facilities 104). For instance, a transmitter antenna may be placed above the conveyor belt, and one or more receiving antennas placed in the surrounding area. In this way, the receiving antennas may be placed in locations that maximize detection that is independent of the transmitter location. In embodiments, receiving antennas may be placed around all sides of the batteries being scanned, either at a distance from the batteries or in proximity or contact with the batteries. For instance, a grid or matrix of flexible or articulated detection antennas 106 may be utilized. In an example, a plurality of detection antennas 106 could hang from a base, much like the bristles on a brush head, and be lowered on to one or more batteries allowing the plurality of detection antennas 106 to come in contact with multiple sides of the battery simultaneously. Alternatively, the grid position of the detection antennas 106 could be fixed, and batteries could be conveyed through the non-rigid antennas, where the antennas would brush against multiple faces of each battery.

In embodiments, RF reflecting material may be employed to reflect RF radiation to or from the LIB 108 (e.g., reflecting an RF signal from the detection antenna 106 to a LIB 108, or reflecting a returned RF emission (a detected RF signal) from a LIB 108 to the detection antenna 106). For instance, RF reflecting material may be incorporated into the conveyor belt assembly (e.g., metal incorporated into the conveyor belt, such as in a layer, laminate, particles, weave, and the like), along the side(s) or over the conveyor belt (e.g., a diffuse reflecting surface, a reflecting surface, a retro-reflector(s), and the like, such as placed on the opposite side of the conveyor from a detection antenna 106), or any other reflecting surface or reflecting device in an environment proximate the battery detection facilities 104. As such, RF reflecting material may aid in detecting a LIB 108 by redirecting signals that would otherwise not be available for detection, such as by adding a second path for interrogating the LIB 108, or providing an interrogating signal path to a LIB 108 that would otherwise be shadowed from the interrogation (e.g., the only path to the LIB 108 is a reflection off of an RF reflecting material embedded in the conveyor belt where the LIB 108 was shadowed by a LAB 110). In this way, adding RF reflecting materials to the detection environment may enhance detection of a LIB 108 through the battery detection facility 104.

In embodiments, in association with either the multiple narrow-FOV detection antenna 106B or the sweeping FOV detection antenna 106C, both of which have location identification capabilities, a directional light may be included to illuminate the detected LIB 108. This may aid in the removal of the LIB 108 from the process, such as by operating personnel, through a vision system, and the like.

Once a LIB 108 has been identified it may be removed by an operator. Alternately, and referring to FIG. 3, a battery articulation facility 302 may be provided to mechanically remove the LIB 108 from the recycling process. For instance, the battery articulation facility 302 may include a mechanical articulator 304 (e.g., rotating arm, piston drive pusher, grabbing device, and the like) to manipulate the LIB 108, such as to remove the LIB 108 from the process. In embodiments, the mechanical articulator may be operated manually by an operator, automatically articulated when a detection is determined, and the like. The battery articulation facility 302 may be positioned such that articulation causes the LIB 108 to be moved out of the process stream such that it is no longer progressing to the breaking stage (e.g., relocated into a bin, onto a platform to the side of the conveyor facility, and the like). The battery articulation facility 302 may also be used to orient batteries such as to make detection more effective, such as positioning batteries in a preferred orientation (e.g., to minimize the distance between the detection antenna 106 and the batteries). In embodiments, one battery articulation facility 302 may be used in an orientation function prior to the batteries being evaluated by the battery detection facility 104 (e.g., to aid in detection) and another battery articulation facility 302 used after detection (e.g., to remove a detected LIB 108).

Figure 3:
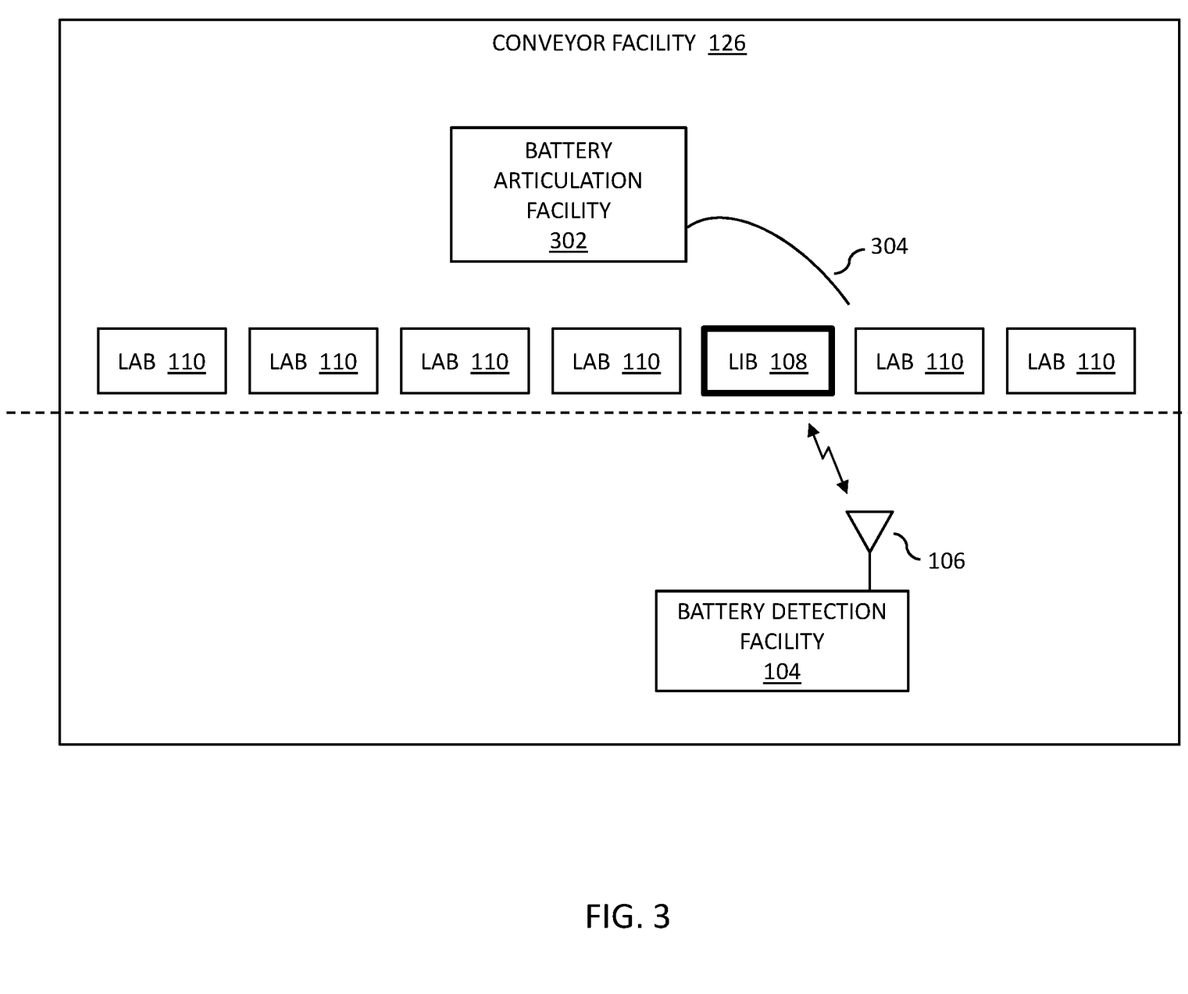
FIG. 3 depicts an embodiment battery separator facility within a conveyor facility.

In embodiments, the battery articulation facility 302 may include a sensor system (e.g., vision system, radar system, ultrasonic system, sonar system, infrared system, X-ray system, neutron imaging system, and the like) to operate in combination with the battery detection facility 104 to provide alerts to a user interface of a mobile device (e.g., where the user interface shows a graphic of a conveyor belt with identified LIBs 108 indicated with a unique color, blinking, brightness, and the like), to provide control information to the mechanical articulator 304 in manipulation of the batteries (e.g., to remove or manipulate a detected LIB 108 with the battery articulation facility 302), to control the running speed of a transportation device within the conveyor facility 126 (e.g., slow a conveyor belt upon a potential detection so the vision system has more time for identification, stop the conveyor belt when the battery articulation facility 302 is detected to have failed to remove the LIB 108), and the like. The combination of the battery detection facility 104 and the sensor system may provide automatic removal of a LIB 108, transmit alerts to users, store detections, provide input to predictive detection systems (e.g., a machine learning system), and the like. In embodiments, a vision system may be triggered when a LIB 108 is detected (or removed) that appends the trigger event with detection information (e.g., photo or video of the battery, timestamp, location information, battery identification information, and the like) to maintain a record of the event. The detection information may also be used for remediation steps. For instance, the detection information may be used to associate the detected LIB 108 with a recycling source, such identifying the customer from which the LIB 108 was shipped, such as determined through a bar code or the like on a shipment pallet. In embodiments, the customer may be charged for the detected LIB 108. In embodiments, the detection information may be used in training data for predictive detection systems.

In embodiments, the battery detection facility 104 may be deployed in locations other than in the conveyor facility 126, such as in the collection facility 120, the transportation facility 122, the handling facility 124, and the like. For instance, the battery detection facility 104 may be deployed in a vehicle of a pick-up service from automotive repair centers, where an antenna configuration 106A, 106B, 106C is mounted to the ceiling of the vehicle to detect the presence of a LIB 108. Given that the vehicle is human operated, and that batteries would only be loaded into the vehicle at discrete times, the battery detection facility 104 may be operated in a batch mode, such as once loading is complete. An illumination device may indicate the location of a detected LIB 108, such as in addition to an audible alarm, halting a conveyor belt, and the like. Similarly, the battery detection facility 104 may be mounted such that individual carts or pallets could be inspected for LIBs 108, such as in the handling facility 124. For instance, batteries are often assembled into cubic bundles on top of pallets, and the battery detection facility 104 may be used to scan these bulk assemblies for LIBs 108.

In embodiments, the battery detection facility 104 and associated detection antenna(s) 106 may be ruggedized for the operating environment. For instance, the battery detection facility 104 may be in proximity to the breaking facility 128 where corrosive materials are being ejected, or in the presence of batteries that are broken as a result of shipment, where corrosives are prone to get onto the surfaces of the battery detection facility 104 and detection antenna(s) 106. In embodiments, ruggedization elements may include coatings, shielding, self-cleaning systems, and the like, and/or manufacturing materials that are corrosion resistant.

In embodiments, the battery detection facility 104 may be calibrated to a local RF environment, such as when the battery detection facility 104 is installed in order to customize the RF power levels and antenna positioning to increase effectiveness of the system while minimizing extraneous RF energy. Further, the battery detection facility 104 may include RF shielding (e.g., a Faraday cage) to help prevent RF energy from radiating into the surrounding area or from entering into the battery detection facility 104, such as RF shielding provided around the battery detection facility 104, around the detection antennas 106, fitted around the installation location, and the like. For instance, RF shielding the battery detection facility 104 may reduce external emissions from entering the system, allowing the battery detection facility 104 to operate with improved signal-to-noise ratio and thus increase the sensitivity of the system or enable a decrease in power levels while maintaining acceptable detection thresholds.

In embodiments, RF shielding may allow greatly increased power levels from the battery detection facility 104 without generating high levels of RF emissions into the surrounding environment (e.g., with respect to regulatory EMI levels for instrumentation, health, and safety), such as on a conveyor facility 126, on a pallet in a receiving area, in a transportation vehicle, and the like. For example, scanning a bulk assembly of batteries on a pallet may require elevated power levels in order to achieve detection of LIBs buried within the assembly, where RF shielding of the battery detection facility 104 may allow for the elevated RF transmission levels required without endangering the health and safety of operating personnel. To increase transmission levels further, the entire assembly of batteries could be covered by a Faraday cage, thus enabling the battery detection facility 104 to operate at high levels of RF energy in the detection process without exceeding safe levels outside the cage. In embodiments, detection antennas 106 (e.g., combined or separate transmission and reception antennas) may be distributed around the inside of the Faraday cage to enable detection from all sides. Varying RF intensity levels may be utilized based on the thickness of the assembly to provide detection at different depths. In embodiments, the battery detection facility 104 may provide automatic power level adjustments based on detection levels through an assembly by other antennas. For example, a transmitter signal on one side of the assembly may be detected by a receiving antenna on the reverse side of the assembly, where the power level of the transmitting antenna is adjusted based on the received signal strength of the receiving antenna. For full coverage through the assembly, there may be a plurality of transmitting and receiving antennas (e.g., a plurality of fixed antennas, mechanically sweeping antennas, electrically sweeping antennas (e.g., phase array antennas), combination mechanically and electrically sweeping antennas), where the battery detection facility 104 may provide automatic power level adjustments based on detection levels through the assembly by the plurality of receiving antennas. Dynamic power adjustment may be provided as the system is deployed around different battery assemblies (e.g., around different pallets of batteries being inspected in the handling facility 124). In addition, or as an alternative, bulk assembly detection may be performed by detection antennas 106 being inserted into the bulk assembly as probes. For example, detection antennas 106 may be inserted into the assembly between the batteries, so that batteries beneath the surface or outer faces of the stack would be closer to the detection antennas 106.

Figure 4:
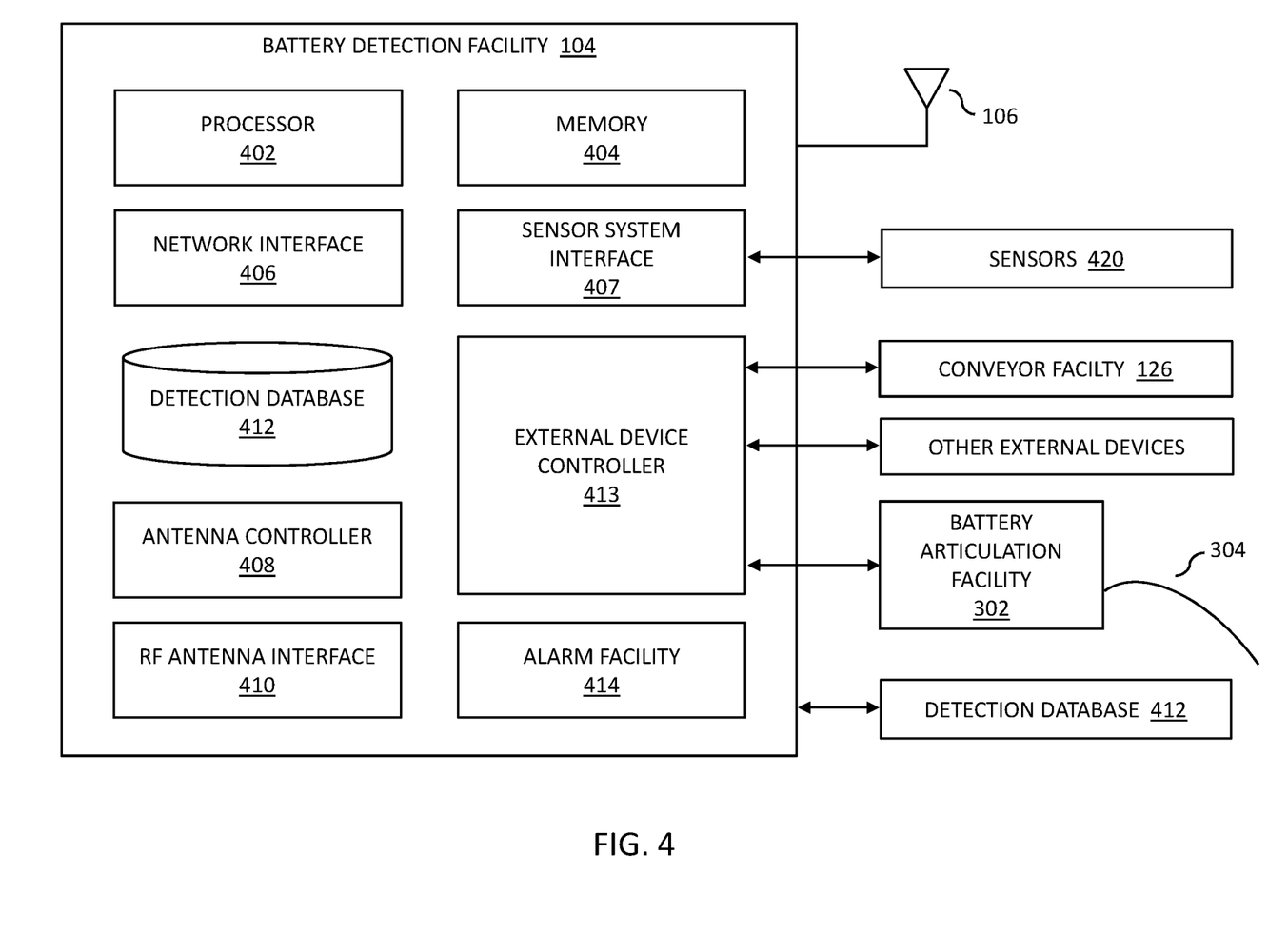
FIG. 4 depicts embodiment electronics modules for a battery detection facility.

Referring to FIG. 4, the battery detection facility 104 may have a processor 402, a memory 404, a network interface 406, sensor system interface 407 to sensors 420 (e.g., vision system, radar system, ultrasonic system, sonar system, infrared system, X-ray system, neutron imaging system, and the like), an antenna controller 408, an RF antenna interface 410, a detection database 412, an external device controller 413, an alarm facility 414, and the like, to implement the functions of the battery detection facility 104. In embodiments, the antenna controller 408 and RF antenna interface 410 may provide control and interfaces for a plurality of detection antenna 106 configurations, such as described herein, as well as for physical repositioning of the various associated components of the detection antennas 106. The external device controller 413 may provide control of external devices, such as for conveyor facility 126 position and speed changes, Faraday cage positioning control, battery articulation facility 302 control, and the like other external devices, such as based on the detection logic. The battery detection facility 104 may be programmable to different detection environments (e.g., RF power levels, operational frequencies, sweep angles, operation modes, and the like), alarm indications (e.g., audible, detection illumination, transmission of alarm indication across a network), network availability (e.g., Wi-Fi, cellular, and the like), and all other programmable features associated with detection operations. Alarm indications may be sounded locally (e.g., audible alarm), but may also be transmitted to a remote user, such as an operator that is not within hearing distance of an audible alarm or in a noise environment where an audible alarm could be missed. The battery detection facility 104 may store past detections, detection profiles, and the like. For instance, the battery detection facility 104 may store harmonic detection profiles associated with the response from specific recycling environments, such as where the ratios of the second and third harmonic response from an RF signal differs from location to location, and where a harmonic detection profile may be measured, stored, and utilized for a specific deployment of a battery detection facility 104.

In embodiments, the battery detection facility 104 may provide an alarm over a network to a remote client device, such as by providing a user interface dashboard to a user for installation on the remote mobile device. The alert may be generated and transmitted over a communication channel to the remote client device associated with the user based upon a destination address and transmission protocol that is associated with the remote client device, wherein the alert activates the user interface dashboard to cause the alert to display on the remote client device and to enable connection with the user interface dashboard when the remote client device is activated. In embodiments, the alert may cause the remote client device to awaken from a "sleep mode" or other type of inactive mode and/or transition from a state of being disconnected from a network, such as to the Internet, VPN or some other network type, to a connected state. For example, the battery detection facility 104 may transmit an alert over a network of the recycling facility, such as including Wi-Fi connection for mobile devices. However, a user may be in a location where the Wi-Fi signal is too weak for reception. In this instance, the battery detection facility 104 may transmit the alert over a secondary network, such as a cellular network, Bluetooth connection, and the like, to wake the user's device and present the alert through the user interface. In this way, the user may be better assured of an alert detection to prevent a potentially dangerous condition.

The battery detection facility 104 may store data over time, such as to enable the battery detection facility 104 to detect a level of change to trigger a report, alert, or some other type of notifying action, to be set by a user or by the battery detection facility 104. For example, the battery detection facility 104 may have data stored in the detection database 412 regarding past detections and/or actions from which the battery detection facility 104 may derive a level of change that is of interest to the user. For instance, the battery detection facility 104 may detect that a current pattern of detection matches a past detection pattern and alert the user to the current repeat of the pattern. For example, a pattern may be detected that is indicative of a future increase in electronics detections (e.g., a recycling shipment that has an elevated number of LIBs mixed in with the LAB s, and the like). Predictive alerting may enable the user to halt the line before the LIBs proceed any further through the system, such as to allow the user to run a manual sweep through a recycling facility 102 with a hand-held battery detection facility or run the line more slowly to decrease the likelihood of a failed electronics detection. Likewise, in a low-likelihood LIB environment, the conveying speed may be increased.

The programmed methods and/or instructions described herein may be deployed in part or in whole through a machine that executes computer software, program codes, and/or instructions on a processor or processors. "Processor" used herein is synonymous with the plural "processors" and the two terms may be used interchangeably unless context clearly indicates otherwise. The processor may be part of a server, client, network infrastructure, mobile computing platform, stationary computing platform, or other computing platform. A processor may be any kind of computational or processing device capable of executing program instructions, codes, binary instructions and the like. The processor may be or include a signal processor, digital processor, embedded processor, microprocessor or any variant such as a co-processor (math co-processor, graphic co-processor, communication co-processor and the like) and the like that may directly or indirectly facilitate execution of program code or program instructions stored thereon. In addition, the processor may enable execution of multiple programs, threads, and codes. The threads may be executed simultaneously to enhance the performance of the processor and to facilitate simultaneous operations of the application. By way of implementation, methods, program codes, program instructions and the like described herein may be implemented in one or more threads. The thread may spawn other threads that may have assigned priorities associated with them; the processor may execute these threads based on priority or any other order based on instructions provided in the program code. The processor may include memory that stores methods, codes, instructions and programs as described herein and elsewhere. The processor may access a storage medium through an interface that may store methods, codes, and instructions as described herein and elsewhere. The storage medium associated with the processor for storing methods, programs, codes, program instructions or other type of instructions capable of being executed by the computing or processing device may include but may not be limited to one or more of a CD-ROM, DVD, memory, hard disk, flash drive, RAM, ROM, cache, and the like.

A processor may include one or more cores that may enhance speed and performance. In embodiments, the process may be a dual core processor, quad core processors, other chip-level multiprocessor and the like that combine two or more independent cores (called a die).

The methods and systems described herein may be deployed in part or in whole through a machine that executes computer software on a server, client, firewall, gateway, hub, router, or other such computer, and/or networking hardware. The software program may be associated with a server that may include a file server, print server, domain server, Internet server, intranet server and other variants such as secondary server, host server, distributed server and the like. The server may include one or more of memories, processors, computer readable media, storage media, ports (physical and virtual), communication devices, and interfaces capable of accessing other servers, clients, machines, and devices through a wired or a wireless medium, and the like. The methods, programs or codes as described herein and elsewhere may be executed by the server. In addition, other devices required for execution of methods as described in this application may be considered as a part of the infrastructure associated with the server.

The server may provide an interface to other devices including, without limitation, clients, other servers, printers, database servers, print servers, file servers, communication servers, distributed servers, and the like. Additionally, this coupling and/or connection may facilitate remote execution of program across the network. The networking of some or all of these devices may facilitate parallel processing of a program or method at one or more location without deviating from the scope. In addition, any of the devices attached to the server through an interface may include at least one storage medium capable of storing methods, programs, code, and/or instructions. A central repository may provide program instructions to be executed on different devices. In this implementation, the remote repository may act as a storage medium for program code, instructions, and programs.

The software program may be associated with a client that may include a file client, print client, domain client, Internet client, intranet client and other variants such as secondary client, host client, distributed client, and the like. The client may include one or more of memories, processors, computer readable media, storage media, ports (physical and virtual), communication devices, and interfaces capable of accessing other clients, servers, machines, and devices through a wired or a wireless medium, and the like. The methods, programs or codes as described herein and elsewhere may be executed by the client. In addition, other devices required for execution of methods as described in this application may be considered as a part of the infrastructure associated with the client.

The client may provide an interface to other devices including, without limitation, servers, other clients, printers, database servers, print servers, file servers, communication servers, distributed servers, and the like. Additionally, this coupling and/or connection may facilitate remote execution of program across the network. The networking of some or all of these devices may facilitate parallel processing of a program or method at one or more location without deviating from the scope. In addition, any of the devices attached to the client through an interface may include at least one storage medium capable of storing methods, programs, applications, code, and/or instructions. A central repository may provide program instructions to be executed on different devices. In this implementation, the remote repository may act as a storage medium for program code, instructions, and programs.

The methods and systems described herein may be deployed in part or in whole through network infrastructures. The network infrastructure may include elements such as computing devices, servers, routers, hubs, firewalls, clients, personal computers, communication devices, routing devices and other active and passive devices, modules and/or components as known in the art. The computing and/or non-computing device(s) associated with the network infrastructure may include, apart from other components, a storage medium such as flash memory, buffer, stack, RAM, ROM, and the like. The processes, methods, program codes, instructions described herein and elsewhere may be executed by one or more of the network infrastructural elements.

The methods, program codes, and instructions described herein and elsewhere may be implemented on a cellular network having multiple cells. The cellular network may either be frequency division multiple access (FDMA) network or code division multiple access (CDMA) network. The cellular network may include mobile devices, cell sites, base stations, repeaters, antennas, towers, and the like. The cell network may be a GSM, GPRS, 3G, 4G, LTE, EVDO, mesh, or other networks types.

The methods, programs codes, and instructions described herein and elsewhere may be implemented on or through mobile devices. The mobile devices may include navigation devices, cell phones, mobile phones, mobile personal digital assistants, laptops, palmtops, netbooks, pagers, electronic books readers, music players, and the like. These devices may include, apart from other components, a storage medium such as a flash memory, buffer, RAM, ROM, and one or more computing devices. The computing devices associated with mobile devices may be enabled to execute program codes, methods, and instructions stored thereon.

Alternatively, the mobile devices may be configured to execute instructions in collaboration with other devices. The mobile devices may communicate with base stations interfaced with servers and configured to execute program codes. The mobile devices may communicate on a peer to peer network, mesh network, or other communications network. The program code may be stored on the storage medium associated with the server and executed by a computing device embedded within the server. The base station may include a computing device and a storage medium. The storage device may store program codes and instructions executed by the computing devices associated with the base station.

The computer software, program codes, and/or instructions may be stored and/or accessed on machine readable media that may include: computer components, devices, and recording media that retain digital data used for computing for some interval of time; semiconductor storage known as random access memory (RAM); mass storage typically for more permanent storage, such as optical discs, forms of magnetic storage like hard disks, tapes, drums, cards and other types; processor registers, cache memory, volatile memory, non-volatile memory; optical storage such as CD, DVD; removable media such as flash memory (e.g. USB sticks or keys), floppy disks, magnetic tape, paper tape, punch cards, standalone RAM disks, Zip drives, removable mass storage, off-line, and the like; other computer memory such as dynamic memory, static memory, read/write storage, mutable storage, read only, random access, sequential access, location addressable, file addressable, content addressable, network attached storage, storage area network, bar codes, magnetic ink, and the like.

The methods and systems described herein may transform physical and/or or intangible items from one state to another. The methods and systems described herein may also transform data representing physical and/or intangible items from one state to another.

The elements described and depicted herein, including in flow charts and block diagrams throughout the figures, imply logical boundaries between the elements. However, according to software or hardware engineering practices, the depicted elements and the functions thereof may be implemented on machines through computer executable media having a processor capable of executing program instructions stored thereon as a monolithic software structure, as standalone software modules, or as modules that employ external routines, code, services, and so forth, or any combination of these, and all such implementations may be within the scope of the present disclosure. Examples of such machines may include, but may not be limited to, personal digital assistants, laptops, personal computers, mobile phones, other handheld computing devices, medical equipment, wired or wireless communication devices, transducers, chips, calculators, satellites, tablet PCs, electronic books, gadgets, electronic devices, devices having artificial intelligence, computing devices, networking equipment, servers, routers, and the like. Furthermore, the elements depicted in the flow chart and block diagrams or any other logical component may be implemented on a machine capable of executing program instructions. Thus, while the foregoing drawings and descriptions set forth functional aspects of the disclosed systems, no particular arrangement of software for implementing these functional aspects should be inferred from these descriptions unless explicitly stated or otherwise clear from the context. Similarly, it may be appreciated that the various steps identified and described above may be varied, and that the order of steps may be adapted to particular applications of the techniques disclosed herein. All such variations and modifications are intended to fall within the scope of this disclosure. As such, the depiction and/or description of an order for various steps should not be understood to require a particular order of execution for those steps, unless required by a particular application, or explicitly stated or otherwise clear from the context.

The methods and/or processes described above, and steps thereof, may be realized in hardware, software or any combination of hardware and software suitable for a particular application. The hardware may include a general-purpose computer and/or dedicated computing device or specific computing device or particular aspect or component of a specific computing device. The processes may be realized in one or more microprocessors, microcontrollers, embedded microcontrollers, programmable digital signal processors or other programmable device, along with internal and/or external memory. The processes may also, or instead, be embodied in an application specific integrated circuit, a programmable gate array, programmable array logic, or any other device or combination of devices that may be configured to process electronic signals. It may further be appreciated that one or more of the processes may be realized as a computer executable code capable of being executed on a machine-readable medium.

The computer executable code may be created using a structured programming language such as C, an object oriented programming language such as C++, or any other high-level or low-level programming language (including assembly languages, hardware description languages, and database programming languages and technologies) that may be stored, compiled or interpreted to run on one of the above devices, as well as heterogeneous combinations of processors, processor architectures, or combinations of different hardware and software, or any other machine capable of executing program instructions.

Thus, in one aspect, each method described above and combinations thereof may be embodied in computer executable code that, when executing on one or more computing devices, performs the steps thereof. In another aspect, the methods may be embodied in systems that perform the steps thereof, and may be distributed across devices in a number of ways, or all of the functionality may be integrated into a dedicated, standalone device or other hardware. In another aspect, the means for performing the steps associated with the processes described above may include any of the hardware and/or software described above. All such permutations and combinations are intended to fall within the scope of the present disclosure.

While the methods and systems described herein have been disclosed in connection with certain preferred embodiments shown and described in detail, various modifications and improvements thereon may become readily apparent to those skilled in the art. Accordingly, the spirit and scope of the methods and systems described herein is not to be limited by the foregoing examples, but is to be understood in the broadest sense allowable by law.

All documents referenced herein are hereby incorporated by reference.

What is claimed is:

1. A method comprising:
   detecting, via interrogation by a radio frequency signal, a battery amongst a plurality of recycling materials wherein a detection antenna system emits the radio frequency signal and detects the battery when the detection antenna system receives a returned detected radio frequency signal that is a harmonic of the radio frequency signal as emitted by an electronic circuit in the battery.

2. The method of claim 1, wherein the detecting is provided by the detection antenna system emitting multiple radio frequency signals from multiple antennas.

3. The method of claim 1, wherein the returned detected radio frequency signal is reflected by a reflecting surface proximate the plurality of recycling materials.

4. The method of claim 3, wherein the reflecting surface is a conveyor belt comprising radio frequency reflecting material.

5. The method of claim 1, wherein the battery is a lithium-ion battery.

6. The method of claim 1, wherein the plurality of recycling materials is disposed on a conveyor belt in a conveyor facility and the method further comprises:
mounting the detection antenna system proximate to the conveyor facility.

7. The method of claim 1 further comprising:
detecting, via interrogation by a second radio frequency signal, the battery, wherein a second detection antenna system emits the second radio frequency signal and detects the battery when the second detection antenna system receives a second returned radio frequency detected signal that is a harmonic of the second radio frequency signal as emitted by the electronic circuit in the battery.

8. The method of claim 7 further comprising:
mounting the detection antenna system proximate to a conveyor facility that transports the plurality of recycling materials; and
mounting the second detection antenna system proximate to the conveyor facility;
wherein the detection antenna system and the second detection antenna system are independently positionable with respect to the conveyor facility.

9. The method of claim 1, wherein the battery is a lithium-ion battery.

10. The method of claim 1, wherein the detection antenna system comprises:
a plurality of narrow field view antennas each covering a different area.

11. A method comprising:
transmitting a radio frequency signal via an antenna detection system;
receiving, via the antenna detection system, a returned radio frequency signal that is a harmonic of the radio frequency signal; and
determining, via at least one processor, that the returned radio frequency signal corresponds to a battery.

12. The method of claim 11 further comprising:
generating and transmitting an alert, via the at least one processor, in response to determining that the returned radio frequency signal corresponds to a battery.

13. The method of claim 11, wherein determining that the returned radio frequency signal corresponds to a battery is based at least in part on a determining that the returned radio frequency signal corresponds to a non-linear junction.

14. The method of claim 13, wherein determining that the returned radio frequency signal corresponds to a non-linear junction comprises:
determining one or more transitory peaks formed, in part, by the returned radio frequency signal.

15. The method of claim 11, wherein the antenna detection system comprises:
at least one narrow field of view detection antenna.

16. A method comprising:
transmitting a radio frequency signal via an antenna detection system;
receiving, via the antenna detection system, a returned radio frequency signal that is a harmonic of the radio frequency signal; and
determining, via at least one processor, that the returned radio frequency signal corresponds to a non-linear junction.

17. The method of claim 16, wherein the non-linear junction corresponds to a battery.

18. The method of claim 16 further comprising:
mounting the antenna detection system proximate to a conveyor facility that processes a plurality of recyclable material;
wherein transmitting the radio frequency signal via the antenna detection system comprises:
directing the radio frequency signal towards the plurality of recyclable material.

19. The method of claim 16 further comprising:
generating and transmitting an alert, via the at least one processor, in response to determining that the returned radio frequency signal corresponds to a non-linear junction.

20. The method of claim 16, wherein the antenna detection system comprises:
at least one narrow field of view detection antenna.

* * * * *